United States Patent
Bell

(10) Patent No.: US 11,601,635 B2
(45) Date of Patent: Mar. 7, 2023

(54) RAPID GROUND-PLANE DISCRIMINATION IN STEREOSCOPIC IMAGES

(71) Applicant: BlackBerry Limited, Waterloo (CA)

(72) Inventor: Gordon Bell, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/643,051

(22) Filed: Dec. 7, 2021

(65) Prior Publication Data

US 2022/0103801 A1   Mar. 31, 2022

Related U.S. Application Data

(63) Continuation of application No. 15/907,887, filed on Feb. 28, 2018, now Pat. No. 11,202,055.

(51) Int. Cl.
| | |
|---|---|
| *H04N 13/20* | (2018.01) |
| *G06V 20/56* | (2022.01) |
| *G06V 20/58* | (2022.01) |
| *H04N 13/00* | (2018.01) |

(52) U.S. Cl.
CPC ............. *H04N 13/20* (2018.05); *G06V 20/56* (2022.01); *G06V 20/58* (2022.01); *G06V 20/582* (2022.01); *G06V 20/588* (2022.01); *H04N 2013/0081* (2013.01)

(58) Field of Classification Search
CPC ........... H04N 13/20; H04N 2013/0081; H04N 13/106; H04N 13/239; G06V 20/56; G06V 20/58; G06V 20/582; G06V 20/588; G06V 10/751; G06T 7/593; G06T 7/12; G06T 7/33; G06T 7/70; G06T 2207/10012
See application file for complete search history.

(56) References Cited

U.S. PATENT DOCUMENTS

| | | | |
|---|---|---|---|
| 7,111,996 B2 | 9/2006 | Seger et al. | |
| 7,957,562 B2 * | 6/2011 | Chang | G06V 20/58 382/113 |
| 10,165,246 B2 * | 12/2018 | Buerkle | H04N 13/128 |
| 2002/0191837 A1 * | 12/2002 | Takeda | G08G 1/166 382/104 |
| 2004/0252864 A1 * | 12/2004 | Chang | G06V 20/58 382/104 |
| 2006/0013438 A1 * | 1/2006 | Kubota | G06V 20/58 382/103 |

(Continued)

FOREIGN PATENT DOCUMENTS

| | | | | |
|---|---|---|---|---|
| EP | 2608111 A2 * | 6/2013 | | G01C 11/04 |
| JP | 2006105661 A * | 4/2006 | | G06K 9/00785 |

(Continued)

OTHER PUBLICATIONS

Cabani et al. Color Stereoscopic Steps for Road Obstacle Detection (Year: 2006).*

(Continued)

*Primary Examiner* — Robert J Hance
(74) *Attorney, Agent, or Firm* — Trop, Pruner & Hu, P.C.

(57) ABSTRACT

A stereoscopic vision system captures stereoscopic images. The stereoscopic images are processed to rapidly discriminate between portions of the images that are on a ground-plane and those that are off the ground plane. The discrimination is based on comparing locations within the images using an expected disparity shift.

20 Claims, 9 Drawing Sheets

(56) References Cited

U.S. PATENT DOCUMENTS

| | | | | |
|---|---|---|---|---|
| 2006/0095207 A1* | 5/2006 | Reid | ............... | G01S 11/12 |
| | | | | 348/148 |
| 2006/0193511 A1* | 8/2006 | Kimura | ............... | G06V 20/58 |
| | | | | 382/104 |
| 2009/0196492 A1* | 8/2009 | Jung | ............... | G06T 7/579 |
| | | | | 382/154 |
| 2010/0098290 A1* | 4/2010 | Zhang | ............... | G08G 1/165 |
| | | | | 701/41 |
| 2010/0246896 A1* | 9/2010 | Saito | ............... | G06V 20/584 |
| | | | | 382/173 |
| 2013/0129148 A1* | 5/2013 | Nanri | ............... | G08G 1/166 |
| | | | | 382/103 |
| 2014/0355827 A1* | 12/2014 | Ogawa | ............... | G06V 20/584 |
| | | | | 382/103 |
| 2015/0036887 A1* | 2/2015 | Allezard | ............... | G06T 7/75 |
| | | | | 382/106 |
| 2015/0039202 A1* | 2/2015 | Kido | ............... | B60W 30/16 |
| | | | | 701/93 |
| 2015/0278615 A1* | 10/2015 | Ogawa | ............... | H04N 23/80 |
| | | | | 348/148 |
| 2015/0348416 A1* | 12/2015 | Fujita | ............... | G08G 1/16 |
| | | | | 348/47 |
| 2016/0232412 A1* | 8/2016 | Nishijima | ............... | G06V 20/56 |
| 2016/0253575 A1* | 9/2016 | Kakegawa | ............... | G08G 1/165 |
| | | | | 701/70 |
| 2017/0001564 A1* | 1/2017 | Bollea | ............... | G06V 20/56 |
| 2017/0205061 A1* | 7/2017 | Broers | ............... | H05B 47/155 |
| 2017/0206423 A1* | 7/2017 | Ju | ............... | G06V 10/44 |
| 2018/0018528 A1* | 1/2018 | Xie | ............... | G06V 20/58 |
| 2018/0047147 A1* | 2/2018 | Viswanathan | ............... | G06T 7/246 |
| 2019/0236807 A1* | 8/2019 | Zhang | ............... | G06T 7/85 |

FOREIGN PATENT DOCUMENTS

| | | | | |
|---|---|---|---|---|
| KR | 20100056980 A | * | 5/2010 | |
| TW | 200810814 A | * | 3/2008 | ............... G06K 9/20 |
| WO | WO-2017099199 A1 | * | 6/2017 | ............... G01C 3/06 |

OTHER PUBLICATIONS

Yiruo et al., Complex Ground Plane Detection Based on V-disparity Map in Off-road Environment (Year: 2013).*

Official Action dated May 29, 2020 for Canada Patent Application No. 3034908.

Extended European Search Report dated Jul. 5, 2019 for European patent application 19159296.3.

Official Action dated Dec. 3, 2020 for Canadian Patent Application No. 3034908.

Charkari N M et al: "A new approach for real time moving vehicle detection", Intelligent Robots and Systems '93, IROS '93. Proceedings of the 1993 IEIEE/RSJ International Conference on Yokohama, Japan 26-30 Jul. 1, New York, NY, USA, IEEE, US, vol. 1, Jul. 26, 1993 (Jul. 26, 1993), pp. 273-278.

Young Chul Lim et al: "Stereo-based pedestrian detection using the dynamic ground plane estimation method", Communication and Information Processing, ACM, 2 Penn Plaza, Suite 701 New York NY 10121-0701 USA, Nov. 26, 2016 (Nov. 26, 2016), pp. 110-114.

Oniga F et al: "Processing Dense Stereo Data Using Elevation Maps: Road Surface, Traffic Isle, and Obstacle Detection", IEEE Transactions on Vehicular Technology, IEEE Service Center, Piscataway, NJ, US, vol. 59, No. 3, Mar. 1, 2010, pp. 1172-1182.

Yiruo D, Wenjia W, Yukihiro K. Complex ground plane detection based on v-disparity map in off-road environment. In 2013 IEEE Intelligent Vehicles Symposium (IV) Jun. 23, 2013 (pp. 1137-1142). IEEE.

Dai et al., "Complex Ground Plane Detection Based on V-disparity Map in Off-road Environment," 2013 IEEE Intelligent Vehicles Symposium, pp. 1137-1142 (Year: 2013).

Intellectual Property India, Examination Report for Appl. No. 201944007676 dated Jul. 11, 2022 (7 pages).

European Patent Office, Communication pursuant to Article 94(3) EPC for Appl. No. 19159296.3 dated Jul. 14, 2022 (4 pages).

* cited by examiner

FIG. 5

RAPID GROUND-PLANE DISCRIMINATION IN STEREOSCOPIC IMAGES

CROSS REFERENCE TO RELATED APPLICATIONS

This is a continuation of U.S. application Ser. No. 15/907,887, filed Feb. 28, 2018, the content of which is hereby incorporated by reference.

TECHNICAL FIELD

The current disclosure relates to stereoscopic vision systems and in particular to discriminating on-ground plane image portions from off-ground plane image portions.

BACKGROUND

Stereoscopic vision system use two, or more, cameras to capture pairs of images of the same scene. The stereoscopic images are processed by the vision system to extract 3 dimensional (3D) information, which may be used to determine information such as object size, distance etc. Stereoscopic vision systems typically detect corresponding features, such as a corner of an object, within each of the stereoscopic images and determine a disparity between the feature location in the two images. Based on the disparity information, 3D information can be extracted.

While the 3D information from stereoscopic vision systems may be useful, the feature extraction and feature matching between images required by the stereoscopic vision systems is computationally expensive and as such the use of such systems may be limited in applications.

SUMMARY

In accordance with the present disclosure, there is provided a stereoscopic vision system comprising: a pair of cameras comprising a first camera and a second camera arranged to capture stereoscopic images; a processor for executing instructions; and a memory storing instructions, which when executed configure the stereoscopic vision system to: receive the stereoscopic images comprising a first image captured from the first camera and a second image captured from the second camera; compare sampled locations within the first image to corresponding sampled locations shifted by a predetermined amount within the second image; and based on the comparisons between sampled locations: mark locations in the first and second images as being on a ground plane when the sampled locations and the corresponding sampled locations are the same within a similarity threshold; or mark locations in the first and second images as being off the ground plane when the sampled locations and the corresponding sampled locations are not the same within the similarity threshold.

In accordance with a further embodiment of the stereoscopic vision system, the sampled locations in the first image and the corresponding sampled locations in the second image are determined as a weighted average of pixel values in a vicinity of the locations and the corresponding locations.

In accordance with a further embodiment of the stereoscopic vision system, the pixel values are selected from one or more channels of the first and second images.

In accordance with a further embodiment of the stereoscopic vision system, the memory stores further instructions, which when executed by the processor further configure the stereoscopic vision system to: pass the marked on ground plane locations and corresponding locations of the first and second images to path planning functionality for determining a safe path to travel on.

In accordance with a further embodiment of the stereoscopic vision system, the memory stores further instructions, which when executed by the processor further configure the stereoscopic vision system to: pass the marked off ground plane locations and corresponding locations of the first and second images to object recognition functionality for detecting and classifying an object.

In accordance with a further embodiment of the stereoscopic vision system, the comparing locations within different rows is performed in parallel.

In accordance with a further embodiment of the stereoscopic vision system, the comparing locations processes portions of the stereoscopic images within a possible driving path.

In accordance with a further embodiment of the stereoscopic vision system, the possible driving path is determined in part based on a steering angle of a vehicle.

In accordance with a further embodiment of the stereoscopic vision system, the predetermined amount to shift the corresponding location is determined based on a vertical location of the location within the first image.

In accordance with a further embodiment of the stereoscopic vision system, the predetermined amount to shift the corresponding location is predetermined for different positioning of the first camera and second camera relative to a horizon. In accordance with the present disclosure, there is provided a method of discriminating ground plane locations in stereoscopic images, the method implemented by a processor of a stereoscopic vision system, the method comprising: receiving stereoscopic images comprising a first image captured from a first camera and a second image captured from a second camera, the first camera and the second camera arranged to capture the stereoscopic images; comparing sampled locations within the first image to corresponding sampled locations shifted by a predetermined amount within the second image; and based on the comparisons between sampled locations: marking locations in the first and second images as being on a ground plane when the sampled locations and the corresponding sampled locations are the same within a similarity threshold; or marking locations in the first and second images as being off the ground plane when the sampled locations and the corresponding sampled locations are not the same within the similarity threshold.

In accordance with a further embodiment of the method, the sampled locations in the first image and the corresponding sampled locations in the second image are determined as a weighted average of pixel values in a vicinity of the locations and the corresponding locations.

In accordance with a further embodiment of the method, the pixel values are selected from one or more channels of the first and second images.

In accordance with a further embodiment, the method further comprises passing the marked on ground plane locations and corresponding locations of the first and second images to path planning functionality for determining a safe path to travel on.

In accordance with a further embodiment, the method further comprises passing the marked off ground plane locations and corresponding locations of the first and second images to object recognition functionality for detecting and classifying an object.

In accordance with a further embodiment of the method, the comparing locations within different rows is performed in parallel.

In accordance with a further embodiment of the method, the comparing locations processes portions of the stereoscopic images within a possible driving path.

In accordance with a further embodiment of the method, the possible driving path is determined in part based on a steering angle of a vehicle.

In accordance with a further embodiment of the method, the predetermined amount to shift the corresponding location is determined based on a vertical location of the location within the first image.

In accordance with a further embodiment of the method, the predetermined amount to shift the corresponding location is predetermined for different positioning of the first camera and second camera relative to a horizon. In accordance with the present disclosure, there is provided a non-transitory computer readable memory storing instructions for execution by a processor, the stored instructions comprising instructions, which when executed configure a stereoscopic vision system to: receive stereoscopic images comprising a first image captured from a first camera and a second image captured from a second camera, the first camera and the second camera arranged to capture the stereoscopic images; compare sampled locations within the first image to corresponding sampled locations shifted by a predetermined amount within the second image; and based on the comparisons between sampled locations: mark locations in the first and second images as being on a ground plane when the sampled locations and the corresponding sampled locations are the same within a similarity threshold; or mark locations in the first and second images as being off the ground plane when the sampled locations and the corresponding sampled locations are not the same within the similarity threshold.

BRIEF DESCRIPTION OF THE DRAWINGS

Further features and advantages of the present disclosure will become apparent from the following detailed description, taken in combination with the appended drawings, in which:

FIG. 5 depicts schematically discrimination of ground plane locations in the stereoscopic images;

DETAILED DESCRIPTION

A stereoscopic vision system rapidly discriminates between locations that are on the ground-plane and locations that are not on the ground-plane. The stereoscopic vision system uses an expected disparity for on-ground-plane locations to quickly generate a ground-plane mapping of the locations in the image that are on the ground-plane or off the ground-plane. The discrimination between on ground-plane locations and off ground-plane locations is based on a comparison between corresponding locations in the stereoscopic images. The corresponding locations are determined using the expected disparity. The stereoscopic vision system can discriminate between on and off ground-plane locations using simple comparisons which are computationally inexpensive and so can be performed rapidly.

The ground plane discrimination may be used in various applications, including for example, in autonomous, or semi-autonomous, vehicles. The stereoscopic vision system may be used to process stereoscopic images captured from forward-facing cameras in order to determine portions of the images that are on the ground plane, and as such may be considered as safe to drive on, subject to other requirements such as lane detection, pedestrian detection etc., and portions of the image that are not on the ground plane and as such may be regions of interest for further investigation. Since the stereoscopic vision system can rapidly discriminate the ground plane, the resulting ground-plane mapping can be used by other autonomous vehicle processes, such as route planning, obstacle avoidance, etc. Further, since the discrimination is computationally inexpensive, it allows compute resources to be dedicated to other processes such as traffic signal detection, road sign detection, as well as for redundancy.

The stereoscopic vision system and ground-plane discrimination will be described with reference to FIGS. 1 to 6, which depict schematically the concepts of the discrimination process. It will be appreciated that the depictions in FIGS. 1 to 6 are simplified to highlight the concepts of the ground-plane discrimination. While the examples of FIGS. 1-6 are simplified, it will be apparent that the same technique can be applied to real-world stereoscopic images.

Figure 1:
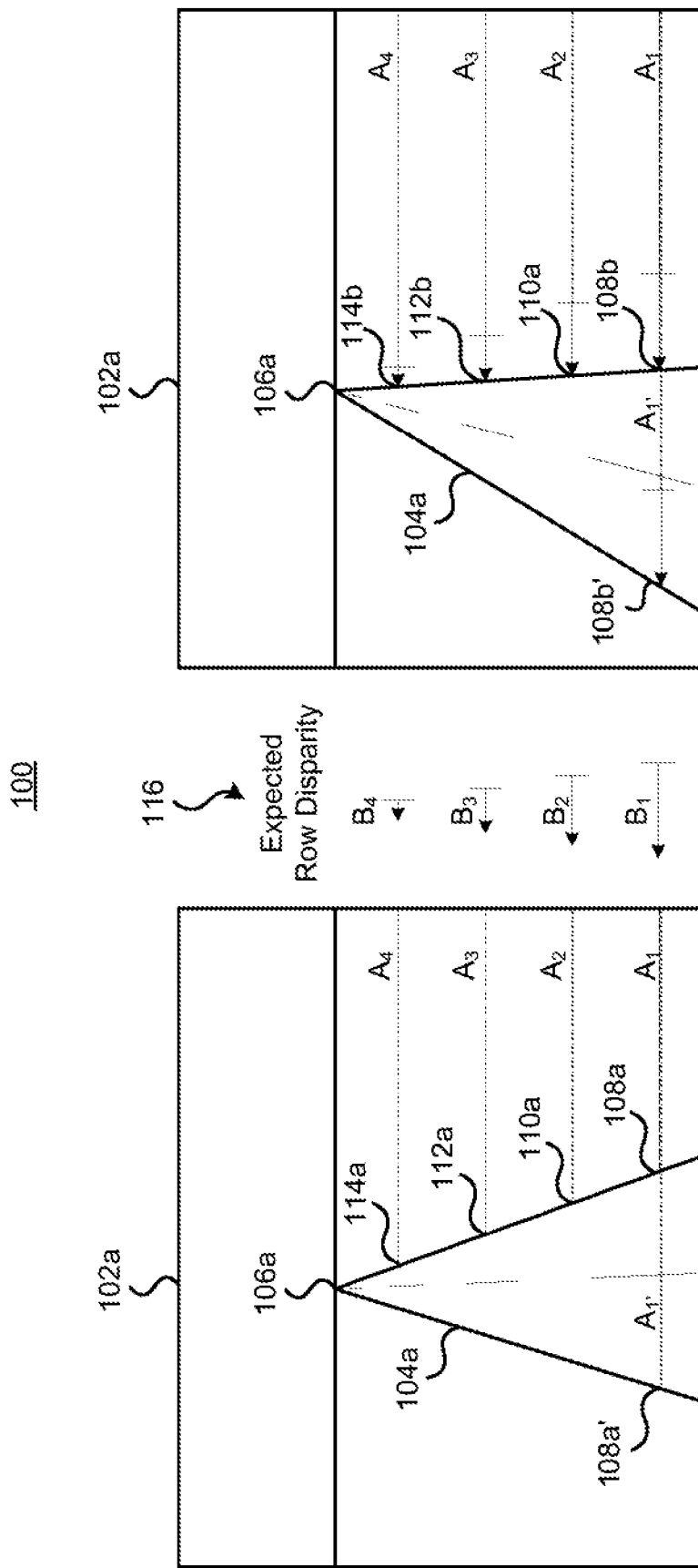
FIG. 1 depicts stereoscopic images capturing a road.

FIG. 1 depicts stereoscopic images capturing a road. The stereoscopic pair 100 comprise a left image 102a captured by a first camera and a right image 102b captured by a second camera. The first and second cameras are assumed to be arranged on a vehicle and capturing a forward-facing view. In order to simplify the comparison between the stereoscopic pair 100, it is desirable that the first camera and second camera have the same, or at least similar, configuration parameters, such as resolution, lens, focal length, etc. as well as being mounted parallel to each other, with the two cameras separated from each other by an appropriate amount, such as for example between 4 and 8 inches.

As depicted in FIG. 1 the left image 102a captures a view of a road 104a disappearing at the horizon 106 and the right image 102b captures a different view of the road 104b disappearing at the horizon, which is a result of the displacement between the mounting locations of the two cameras. As depicted in the left image 102a, a number of points along the road 108a, 110a, 112a, 114a are located respective distances $A_1$-$A_4$ from a left edge of the image. Each of the points along the road 108a, 110a, 112a, 114a are spaced apart from each other vertically in the image, and may be spaced apart from each other horizontally, as depicted in image 102a, although the points along the road 108a, 110a, 112a, 114a need not be displaced horizontally from each other. Two points 108a and 108a' are depicted at the same vertical distance from the bottom of the image. As can be seen in the right image 102b, corresponding points 108b, 108b', 110b, 112b, 114b are located a different distance from the edge of the right image 102b than the left image 102a. The points are spaced the distance of the corresponding points in the left image, namely $A_1$-$A_4$, plus another amount, referred to as the disparity shift, $B_1$-$B_4$ that is based on the vertical location of the point in the image. As can be seen, the points 108b, 110b, 112b, 114b which are all vertically offset from each other, are shifted from their corresponding points in the left image by different disparity shifts. Points 108b and 108b', which have the same vertical location in the image are shifted from their corresponding points in the left image by the same disparity shift, namely $B_1$. From FIG. 1, it can be seen that if a point in an image is on the ground, the corresponding point in the stereoscopic pair will be at a location equal to the first point's location plus a disparity shift that is determined from the point's vertical location in the image. The expected disparity shift 116 is depicted for the different vertical locations within the image.

Figure 2:
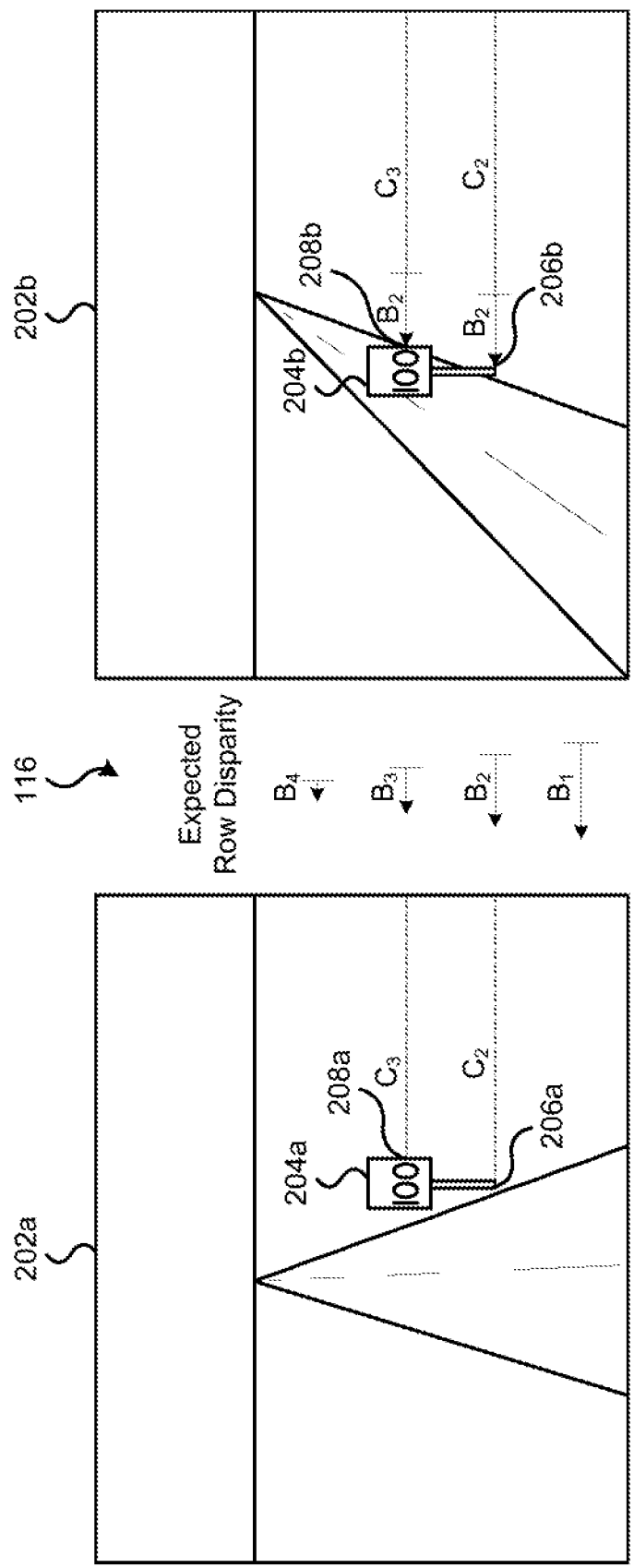
FIG. 2 depicts stereoscopic images capturing a road and road sign.

FIG. 2 depicts stereoscopic images capturing a road and road sign. The stereoscopic pair 200 depicts the same road as shown in FIG. 1; however, there is an additional vertical road sign, such as a speed limit sign. Turning to the left image 202a, it can be seen that two points on the road sign 204a, namely a point 206a where the sign meets the ground and a second point 208a where the sign is located above the ground are located respective distances $C_1$, $C_2$ from the left side of the image 202a. In the right image 202b, the corresponding points 206b, 208b of the road sign 204b are located a distance equal to the corresponding points' 206a, 208b location, namely $C_1$, $C_2$, plus a disparity shift $B_2$. In contrast to the road depicted in FIG. 1 in which points in the image vertically offset from each other are displaced from the corresponding points by different disparity shifts, the two corresponding points 206b, 208b of the road sign 204b, although vertically offset from each other in the image 202b, are displaced from the points 206a, 208a by the same disparity shift of $B_2$. If the point 208a of the road sign 204a and the corresponding point 208b of the road sign 204b were on the ground in the real world, it would be expected that the points would be displaced from each other by a disparity shift of $B_3$, as can be seen from the expected disparity shifts 116. As can be seen, the expected disparity shifts 116 shrink towards the horizon. At and above the horizon, the expected disparity is 0.

From FIGS. 1 and 2 it can be seen that points in image that are on the ground in the real world will have a particular disparity shift between corresponding points that is dependent upon the vertical location of the points in the images. In contrast points in the image of objects that are off the ground in the real world will have the same vertical disparity for all of the points. It is noted that points of objects that are not perfectly vertical in the real-world may not have the same disparity shift between corresponding points, however the disparity will differ from the expected on-ground-plane disparity. The expected disparity shifts between corresponding points that are on the ground-plane can be used to quickly identify portions of the image that are on the ground plane or not on the ground plane.

Figure 3:
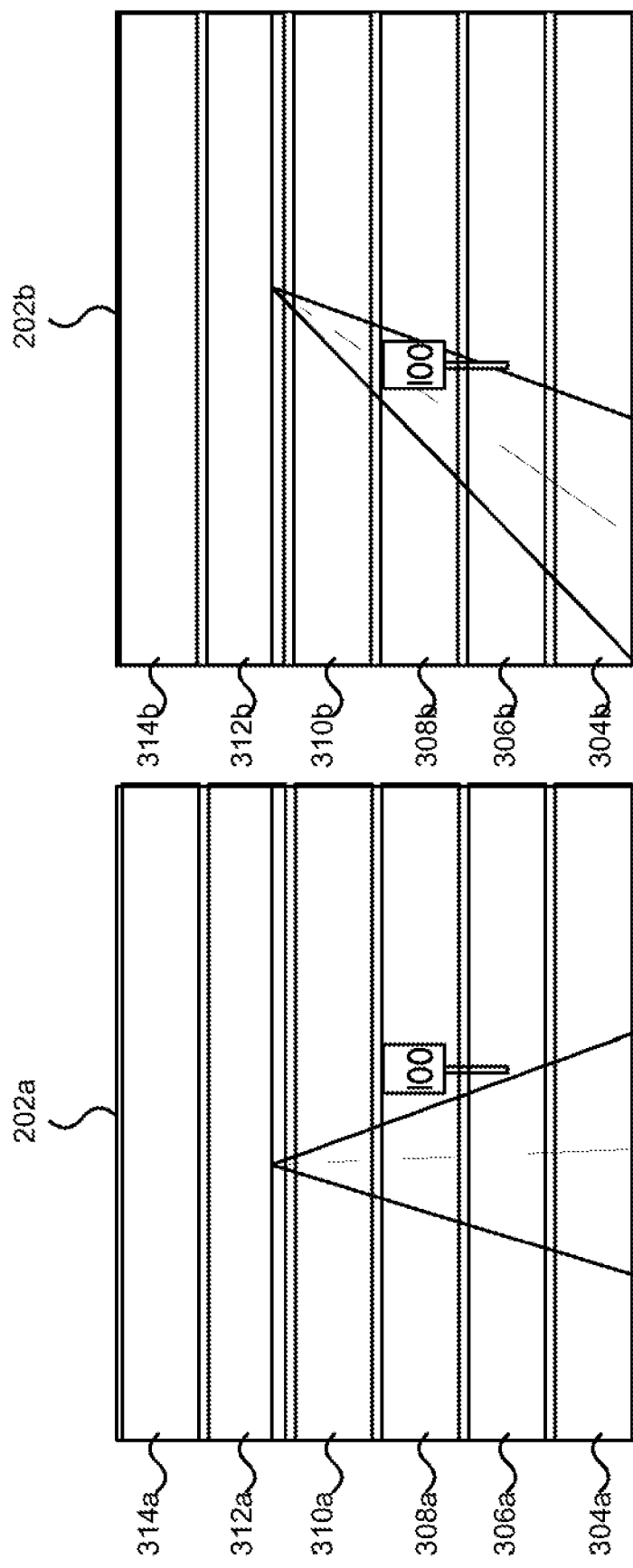
FIG. 3 depicts schematically rows in the stereoscopic images.

FIG. 3 depicts schematically rows in the stereoscopic images. In discriminating between on-ground-plane and off-ground-plane locations within the stereoscopic images, the pair of images may be processed in rows with corresponding points between the images in the row having the same expected ground-plane disparity shift. FIG. 3 depicts the left and right images 202a, 202b segmented into a number of rows 304a, 306a, 308a, 310a, 312a, 314a, 304b, 306b, 308b, 310b, 312b, 314b. The segmentation of the images depicted in FIG. 3 is provided for explanatory purposes and need not be explicitly done when actually discriminating the ground plane in stereoscopic images. Further, the rows are depicted as being relatively large in the vertical dimension of the images for clarity of the figures. In practice, the height of the rows may be for example between 1-10 pixels.

Figure 4:
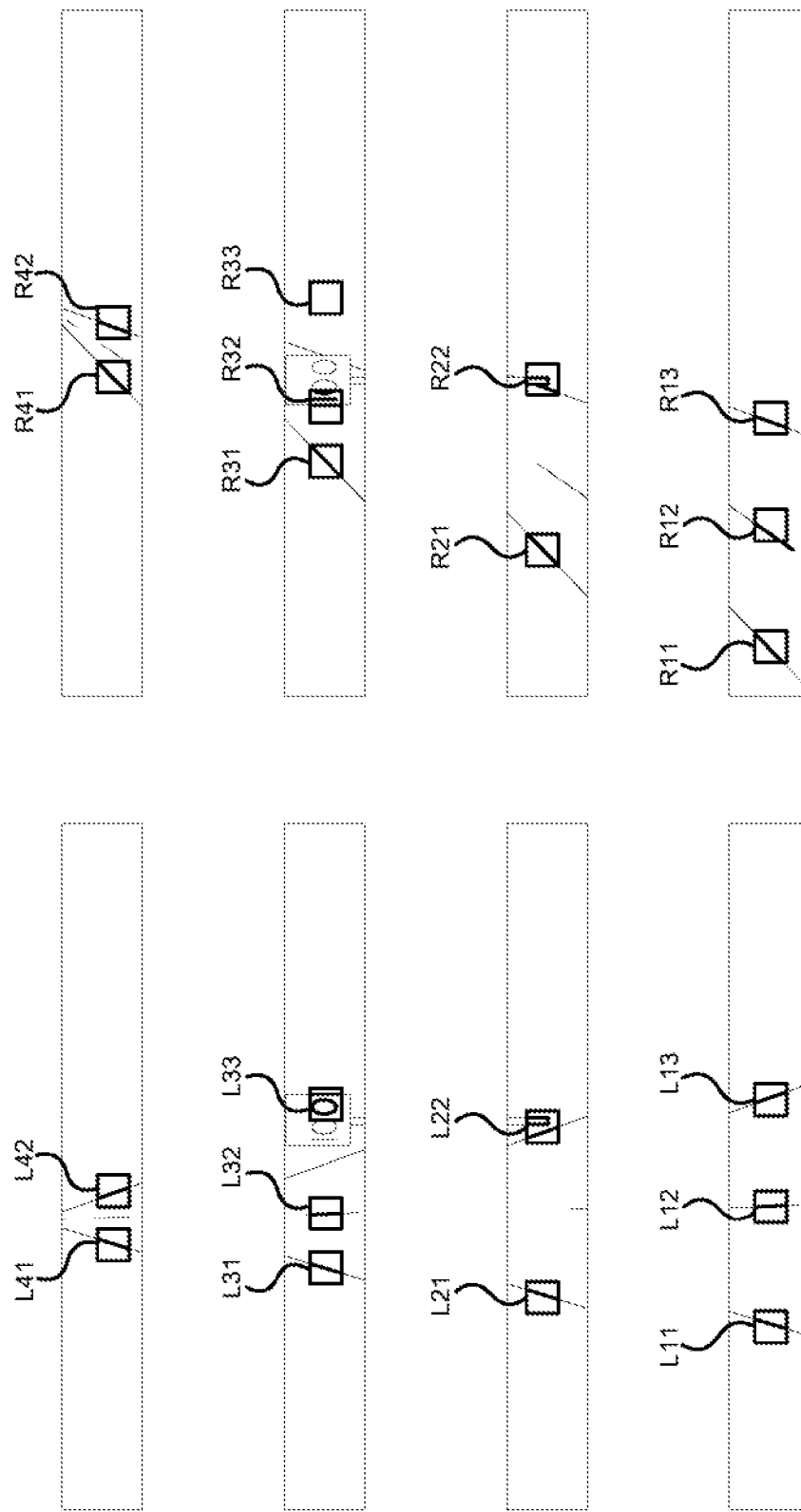
FIG. 4 depicts schematically the processing of stereoscopic images.

FIG. 4 depicts schematically the processing of stereoscopic image rows. As depicted in FIG. 4 a number of sample locations $L_{11}$, $L_{12}$, $L_{13}$, $L_{21}$, $L_{22}$, $L_{31}$, $L_{32}$, $L_{33}$, $L_{41}$, $L_{42}$ in each of the rows 304a, 306a, 308a, 310a are extracted from the left image. The corresponding sample locations $R_{11}$, $R_{12}$, $R_{13}$, $R_{21}$, $R_{22}$, $R_{31}$, $R_{32}$, $R_{33}$, $R_{41}$, $R_{42}$ in the rows 304b, 306b, 308b, 310b of the right image are determined by shifting the respective locations of the points $L_{11}$, $L_{12}$, $L_{13}$, $L_{21}$, $L_{22}$, $L_{31}$, $L_{32}$, $L_{33}$, $L_{41}$, $L_{42}$ by the expected disparity for the respective rows. As depicted for sample point $L_{11}$ in FIG. 4, the points $L_{11}$, $L_{12}$, $L_{13}$, in the bottom row 304a of the left image are shifted by the disparity shift amount $B_1$ associated with the row to the sample points $R_{11}$, $R_{12}$, $R_{13}$. Similarly, sample points $L_{21}$, $L_{22}$ in row 306a are shifted by the disparity shift amount $B_2$ of the row 306a to the sample points $R_{21}$, $R_{22}$. Similarly, points in rows 308a, 310a are shifted by respective disparity shift amounts B3, B4.

Although FIG. 4 depicts samples being extracted at multiple feature locations simultaneously, it is noted that these points are only shown for illustrative purposes. In actual processing, the sample for a row may be slid across the image without having to determine any features within the images.

Each of the sample points $L_{11}$, $L_{12}$, $L_{13}$, $L_{21}$, $L_{22}$, $L_{31}$, $L_{32}$, $L_{33}$, $L_{41}$, $L_{42}$ and corresponding sample points $R_{11}$, $R_{12}$, $R_{13}$, $R_{21}$, $R_{22}$, $R_{31}$, $R_{32}$, $R_{33}$, $R_{41}$, $R_{42}$ are based on the pixel values in the sample area. The sample may be determined in various ways, including as an average of the pixel values, a weighted average, etc.

Figure 5:
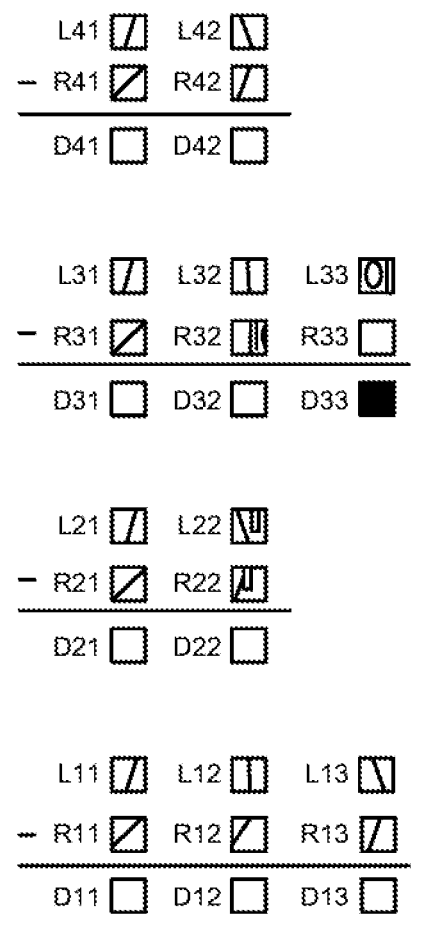

FIG. 5 depicts schematically discrimination of ground plane locations in the stereoscopic images. Each of the sample points $L_{11}$, $L_{12}$, $L_{13}$, $L_{21}$, $L_{22}$, $L_{31}$, $L_{32}$, $L_{33}$, $L_{41}$, $L_{42}$ and corresponding sample points $R_{11}$, $R_{12}$, $R_{13}$, $R_{21}$, $R_{22}$, $R_{31}$, $R_{32}$, $R_{33}$, $R_{41}$, $R_{42}$ from FIG. 4 are reproduced in FIG. 5. As described above, if the sample points in the images correspond to objects on the ground plane in the real world, the sample points should be basically the same and as such, if a sample at a location X in the left image matches a sample at X plus the row's disparity shift in the right image, it can be assumed that the image locations correspond to an object on the ground in the real-world. It will be appreciated that while corresponding samples may be basically the same, they will not be identical since the images are captured from different locations. Accordingly, the match may be determined using a threshold value, that is it is determined if the left sample matches the right sample within the threshold amount. As depicted, the difference between two corresponding samples may be used as an indication of whether or not the sample location is on or off ground. As depicted in FIG. 5, all of the differences of the samples are indicative of the location being on the ground-plane except for difference $D_{iff}34$ between sample L33 and corresponding sample R33 which is depicted as being off ground. The marked samples, provided by the differences between samples $D_{iff}11$, $D_{iff}12$, $D_{iff}13$, $D_{iff}21$, $D_{iff}22$, $D_{iff}31$, $D_{iff}32$, $D_{iff}33$, $D_{iff}41$, $D_{iff}42$, may be used in constructing a mapping of on and off ground plane locations.

Figure 6:
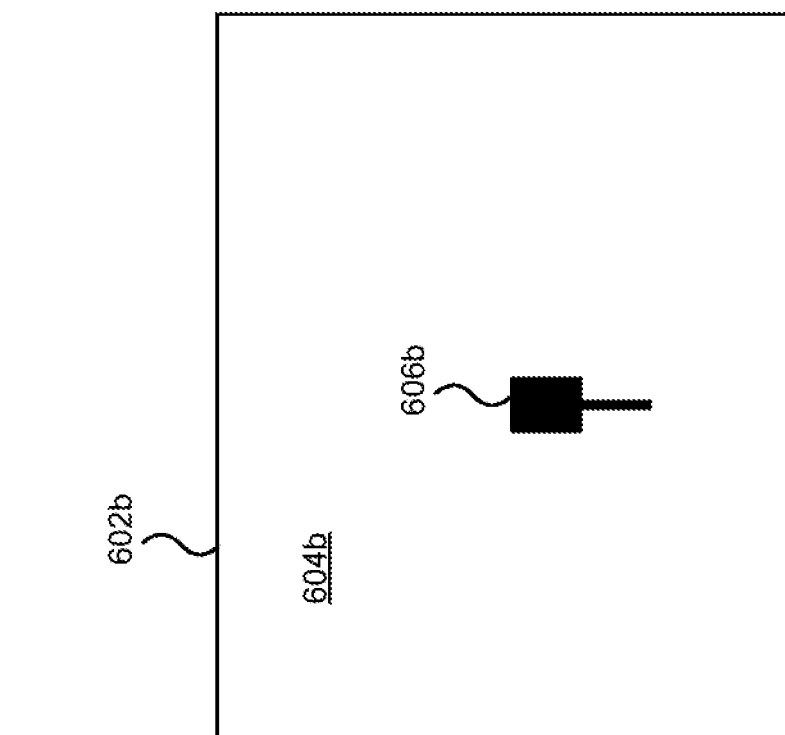
FIG. 6 depicts schematically on and off ground plane locations within a stereoscopic images.
Figure 6:
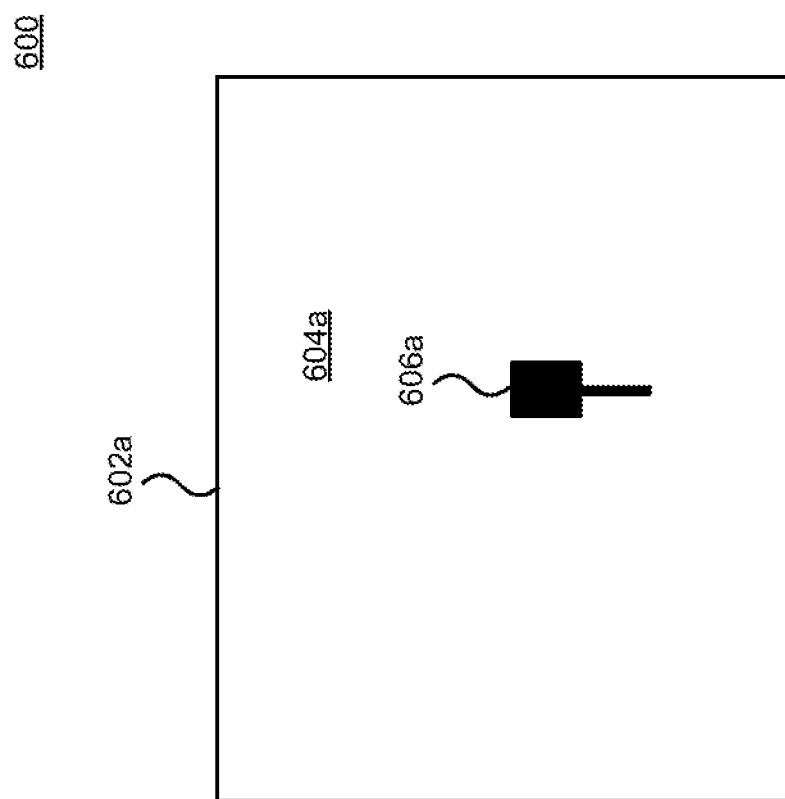

FIG. 6 depicts schematically on and off ground plane locations within a stereoscopic images. The stereoscopic mapping 600 is depicted as a pair of mask images 602a, 602b with the locations determined to be on the ground plane set to white depicted by white portions 604a, 604b and the locations determined to be off the ground plane set to black depicted by white 606*a*, 606*b*. The white locations are considered as being on the ground, while the black locations are considered as being off the ground. The stereoscopic mapping 600 does not provide information about the off ground locations, other than that they are off the ground. However, the stereoscopic mapping can be used to further process the locations of possible off-ground objects in order to possibly identify and classify possible objects as well as information such as distance or range to the object. The mask images 602*a*, 602*b* may be used as a region of interest mask with the off-ground locations providing regions of interest for further processing. For example, the portions of the stereoscopic images corresponding to the black portions 606*a*, 606*b* in the masks may be extracted and processed further to identify possible objects in the region of interest. In, the road example depicted in FIGS. 1 to 5, this may include for example identify the object as a road sign, determining the type of road sign, namely that it is a speed limit sign and the associated information, namely that the speed limit is 100 km/h. The object detection may be based on the particular application, which may dictate the expected scene, as well as the location within the image. For example, in an autonomous vehicle application, a right side of the image would be expected to have road sign information, a bottom portion of the image would be expected to have the road, and a top portion may include traffic lights or overhead signs. Depending upon the location of the regions of interest, different object detection/recognition algorithms that are tailored to the expected scenes may be applied.

Figure 7:
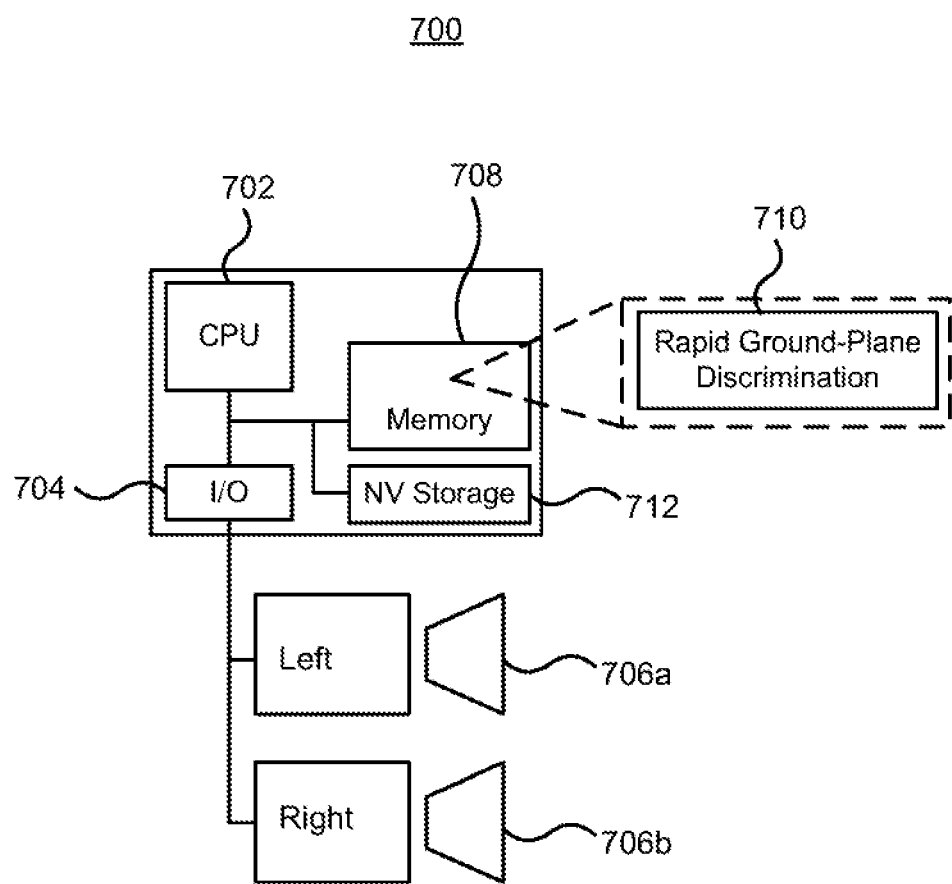
FIG. 7 depicts schematically components of a stereoscopic vision system.

FIG. 7 depicts schematically components of a stereoscopic vision system. The stereoscopic vision system 700 may be provided in a vehicle in order to provide road information to an autonomous vehicle control application that controls operation of the vehicle. The basis of the stereoscopic vision system comprises a processor 702 capable of executing instructions. An input/output (I/O) interface 704 may be used to connect to a pair of cameras, or image capture devices, 706*a*, 706*b*. The cameras 706*a*, 706*b* may be mounted in a known configuration relative to each other such that the cameras are displaced horizontally, or approximately horizontally from each other. Preferably, the characteristics of the cameras are the same and the cameras are genlocked to each other in order to capture images of a moving scene at the same time as each other. The vision system further comprises a non-transitory memory 708 that stores instructions which when executed cause the stereoscopic vision system implement the rapid ground-plane discrimination functionality 710 described above and set forth in further detail below. The vision system 700 may further comprise non-volatile (NV) storage 712 for the storage of data and instructions.

Figure 8:
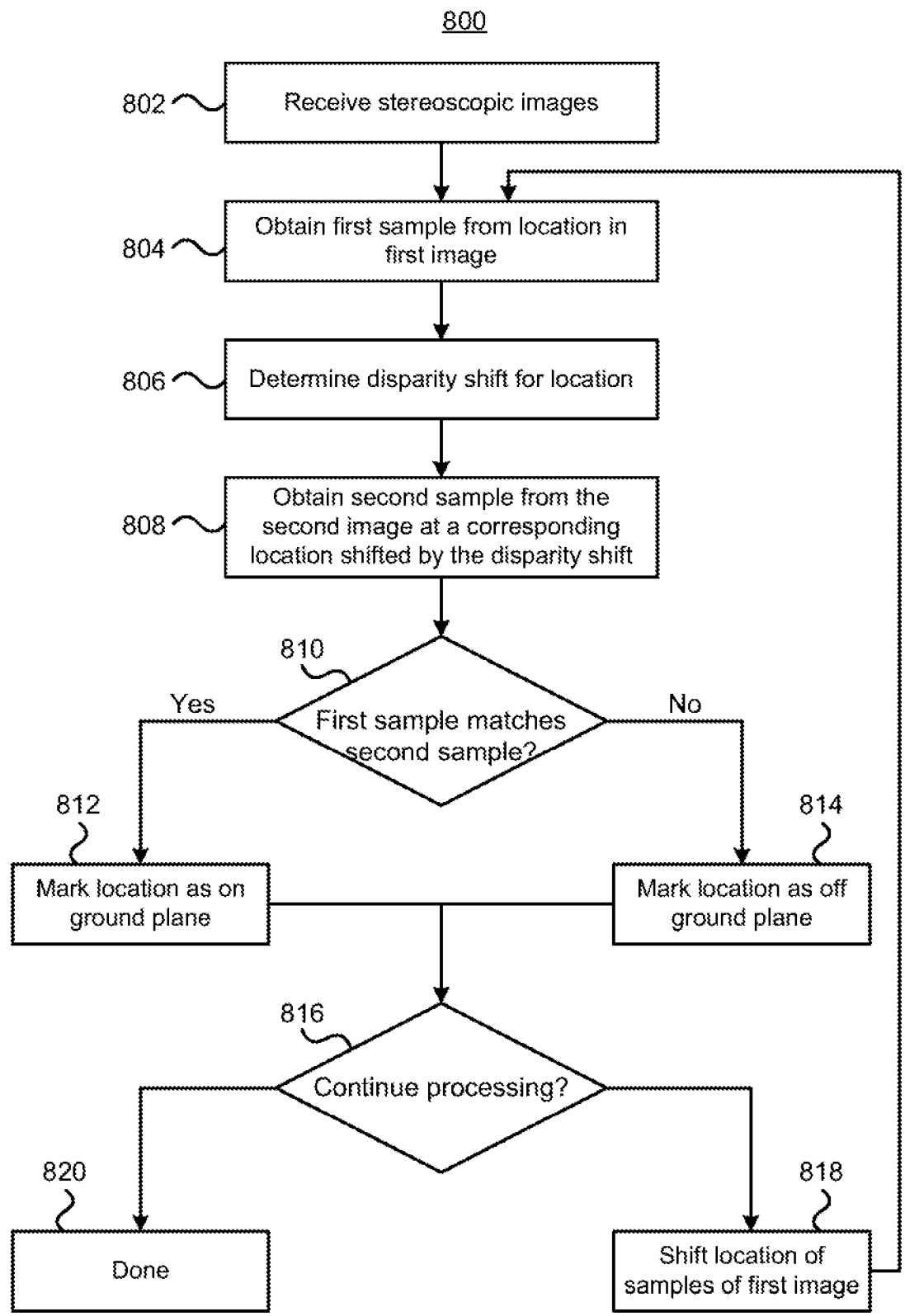
FIG. 8 depicts a method of discriminating a ground plane in stereoscopic images.

FIG. 8 depicts a method of discriminating a ground plane in stereoscopic images. The method 800 may be implemented by the vision system 700. The method 800 receives stereoscopic images (802). The stereoscopic images comprise a first image and a second image that may be stored in the memory while processing. A first sample is obtained from a location in the first image (804). A disparity shift for the location is determined (806) and used to obtain a second sample from the second image (808). The disparity shift may be pre-calculated based on the camera's position. The disparity shift associated with different row heights within the images will depend upon where the cameras are pointing relative to the horizon. The disparity shift for each vertical location within the image can be determined taking into account the tilt of the vehicle or camera system. The determined disparity shift is used to obtain a second sample from a location corresponding to the first sample, but shifted by the determined disparity amount. The first and second samples may be obtained from the images in various ways. For example, the sample may be obtained by sampling values of one or more channel values of the images. The obtained sample may be for example an average of a 1×3 patch in the image. Alternatively, the obtained sample may be obtained as a running weighted average. For example, the samples may be obtained according to a weighted average: $Avg_{weight} = (3*Avg_{weight} + Y)/4$, where Y is the value of the image at the sampling location. Other techniques for sampling the location are possible. The obtained samples are compared to each other to determine if the match (810). The comparison may be made my determining if the difference between the obtained samples is larger than some threshold value, which may be for example 20% of the possible range of values. If the samples match (yes at 810), the locations in the stereoscopic images may be marked as on ground plane locations (812) and if the samples don't match (no at 810) the locations may be marked as being off the ground plane (814). Although depicted as being marked as either on or off the ground plane, it may be possible to use additional classifications based on the comparison of the samples. For example, samples that match within 20% may be marked as on the ground plane, samples that are a mismatch of greater than 50% may be marked as off the ground plane and samples that match within 20-50% may be marked as possibly on the ground plane. Once the location is marked, it is determined if processing should continue (816) and if it should (yes at 816), the sample location is shifted (818). The location of the sample may be shifted horizontally, for example from left to right or right to left. Additionally the sample location may be shifted vertically, for example if a row of the images has been processed, the next row of the image may be processed. Additionally, rows in the image may be skipped, for example each 5 rows may be skipped in processing unless off ground plane locations are found, and then the skipped rows may be processed to locate the boundaries of the off ground locations. If there is no more processing (no at 816) the method is done (820) and the marked locations can be used in other processing.

While the above method 800 has described the process for the ground plane discrimination, it will be appreciated that the method can be implemented in different ways in the vision system. One possible implementation is depicted in the following pseudo code listing.

```
While more rows in image
    While more samples in row:
        extract left sample at X
        extract right sample at X + row disparity
        if left sample matches right sample within threshold:
            mark sample location as on ground-plane
        else
            mark sample location as off ground-plane
        shift X to next sample location
    Done (while more samples in current row)
    determine next row
    reset X sample location
Done (while more rows)
```

Other modifications to the process are possible. For example, rather than obtaining a first sample, determining an expected disparity shift, and then obtaining a second sample as separate individual steps, the steps may be performed together could be combined according to:

$$Avg_{diff} = (3*Avg_{diff} + (Yl_{(x,y)} - Yr_{(x+disp(y),y)}))/4$$

Where:

Avg$_{diff}$ is the difference between the two samples used for the comparison;

Yl$_{(x,y)}$ is the sample value of the left image at location x,y;

Yr$_{(x,y)}$ is the sample value of the right image at location x,y; and disp(y) is the disparity shift value for row y in the images.

The ground plane discrimination described above may be performed rapidly due to the simplicity of comparing one location in an image to another location in a second image. Further, the method may be massively parallelized since each row in the image is independent of other rows and as such the rows in an image may be computed in parallel. Further, by comparing portions of rows linearly, for example from left to right, the image portions for comparison may be easily pre-fetched from memory.

Various performed using an Intel i5, 2.4 Ghz processor and images of 1280×800 in the YUV422 space, in order to detect object locations. The rapid ground plane discrimination algorithm was able to process a frame and detect the location of an object in approximately 1.70 msec, without the use of a GPU. Similar results for the same images obtained using the OpenCV blob detection algorithm took approximately 280 msec.

Figure 9:
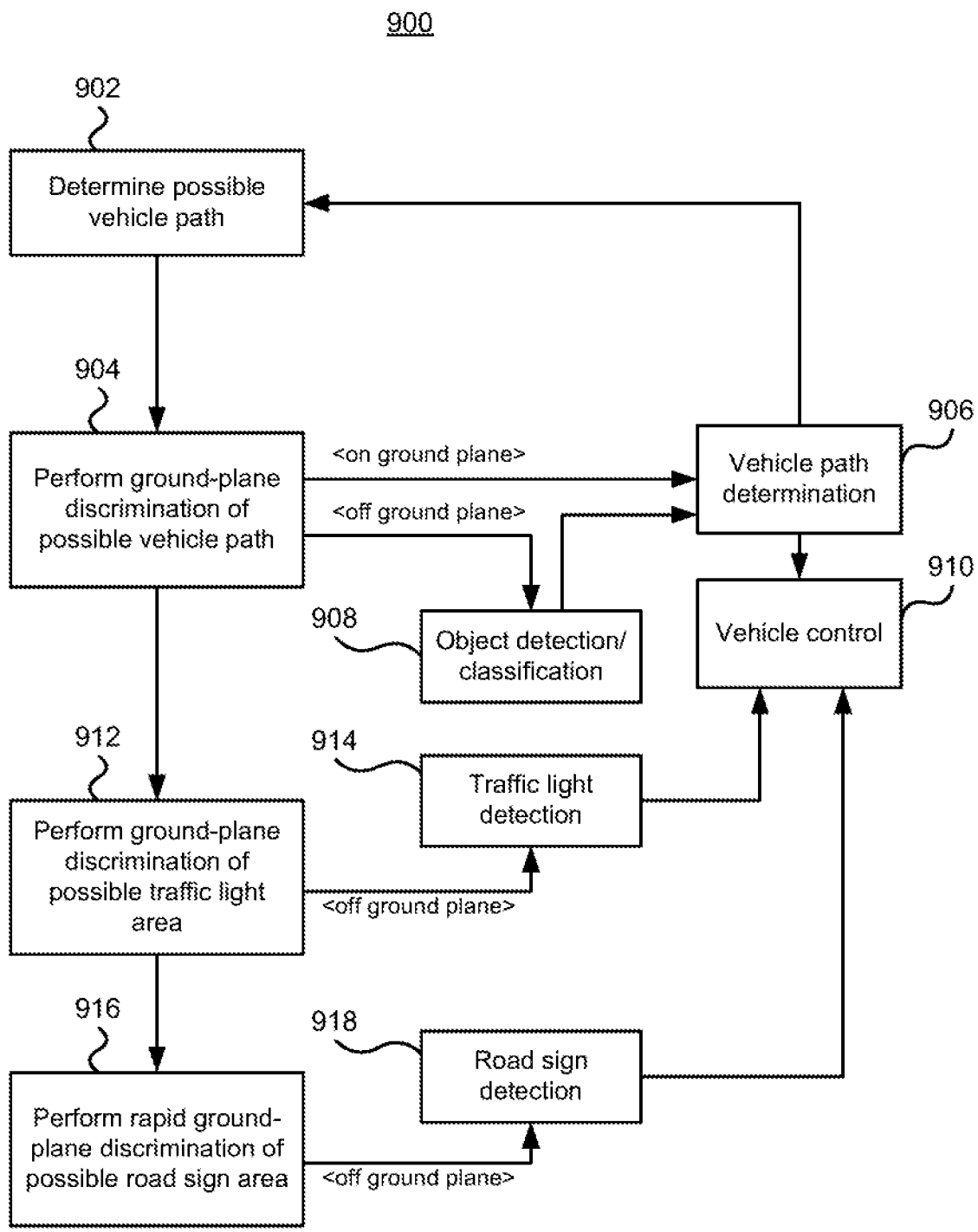
FIG. 9 depicts a method of autonomous vehicle control using ground plane discrimination.

FIG. 9 depicts a method of autonomous vehicle control using ground plane discrimination. In autonomous vehicle control, it is generally desirable to ensure that the immediate driving path is clear from obstacles, which will be objects that are not on the ground. Once the driving path is cleared, other processing may be performed such as object detection and classification. As depicted in process 900, a possible vehicle path may be determined (902). The possible vehicle path may be determined using steering input information as well as path or route planning information. The possible driving path may be used to perform ground-plane discrimination of the possible vehicle path (904). The ground plane discrimination described above may be applied to the portions of the stereoscopic images that are within the possible vehicle path. The on ground plane locations may be passed to vehicle path determination functionality (906) that may use the information to plan the driving path for the vehicle. Off ground plane locations may be passed to object detection/classification functionality (908) that may attempt to determine what is off the ground plane, such as another vehicle, a pedestrian, etc. The results of the object detection/classification may also be passed to the vehicle path determination (906). It will be appreciated that in an autonomous vehicle, multiple redundant systems may be performing the same or similar determinations with the described vision system providing one set of data that can be combined with other sets. For example, the vision system information may be combined with LIDAR information as well as RADAR information. Once the vehicle path is determined, the information can be passed to vehicle control functionality (910). Once the driving path is cleared, additional portions of the images may be processed using the ground plane discrimination. For example, ground plane discrimination may be performed on possible traffic light areas (912), typically in a top portion of the images above the horizon where the expected disparity shift is 0, and the off ground plane locations may be passed to traffic light detection functionality (914), and the results passed to the vehicle control functionality (910). The ground plane discrimination may also be applied to road sign locations (916), typically a right or left side of the image and the off ground plane locations passed to road sign detection functionality (918) that can detect road signs such as speed limits and pass the information to the vehicle control (910). The different locations in an image may obtain the samples from different channels. For example, in a YUV image, object detection may use only the Y channel, while traffic light detection may use a difference between the U and V channels.

The above has described rapid ground plane discrimination functionality using stereoscopic images. The techniques have been described above with regard to particular applications in autonomous road vehicles. The same rapid ground plane discrimination may be used in any application where determining what is considered on and off a ground plane is desirable. Such applications may include vision systems in warehouse applications for detecting the warehouse floor portions that are clear from obstructions, robotic vision systems for controlling where the robotic system may freely move as well as package tracking applications that determine an amount of floor space used in a transport container. For example, a stereoscopic vision system attached to an inside door of a transport container may periodically capture images of the interior volume and use the ground plane discrimination to determine an amount of packages or goods being transported, and possibly determine if the packages have changed, such as after picking up or dropping off packages. In such an application, the amount of on-ground plane locations may be used as an indication of an amount of free space available for additional packages. It will be apparent to those of ordinary skill in the art that similar stereoscopic vision systems capable of rapidly discriminating between on and off ground plane locations may be useful in other applications.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

What is claimed is:

1. A system comprising:
  a processor; and
  a non-transitory storage medium storing instructions executable on the processor to:
    receive stereoscopic images comprising a first image captured at a first camera and a second image captured at a second camera;
    determine a predetermined first shift amount based on a first vertical location of a first portion within the first image;
    determine a predetermined second shift amount based on a different second vertical location of a second portion within the first image, wherein the predetermined second shift amount differs from the predetermined first shift amount by a given amount; and
    identify an object in the first image and the second image as off ground with respect to a road based on a first shift between a first point of the object at the first vertical location within the first image and a corresponding first point of the object at the first vertical location within the second image differing, by an amount that is different from the given amount, from a second shift between a second point of the object at the second vertical location within the first image and a corresponding second point of the object at the second vertical location within the second image.

2. The system of claim 1, wherein the instructions are executable on the processor to identify the object as off ground with respect to the road based on the first shift being the same as the second shift.

3. The system of claim 1, wherein the instructions are executable on the processor to identify the object as off ground with respect to the road based on a difference between the first shift and the second shift being within a threshold difference of one another.

4. The system of claim 1, wherein the instructions are executable on the processor to identify the object as off ground with respect to the road based on a difference between the first shift and the second shift being less than the given amount.

5. The system of claim 1, wherein the predetermined first shift amount is a shift of the first portion at the first vertical location in the first image relative to the first portion at the first vertical location in the second image, and wherein the predetermined second shift amount is a shift of the second portion at the second vertical location in the first image relative to the second portion at the second vertical location in the second image.

6. The system of claim 5, wherein each of the first shift and the second shift is a lateral shift at a respective vertical location of the first and second vertical locations.

7. The system of claim 1, wherein each of the first image and the second image comprises a representation of the road.

8. The system of claim 7, wherein the instructions are executable on the processor to identify a further object as being on the ground with respect to the road in response to determining that a third shift between a first point of the further object at the first vertical location within the first image and a corresponding first point of the further object at the first vertical location within the second image differing, by the given amount, from a second shift between a second point of the further object at the second vertical location within the first image and a corresponding second point of the further object at the second vertical location within the second image.

9. The system of claim 8, wherein the further object is part of the road in the first and second images.

10. The system of claim 1, wherein the system comprises a vehicle, and the processor and the non-transitory storage medium storing the instructions are part of the vehicle.

11. The system of claim 1, wherein the instructions are executable on the processor to detect a type of the object in response to identifying the object as being off ground with respect to the road.

12. A non-transitory machine-readable storage medium comprising instructions that upon execution cause a system to:
receive stereoscopic images comprising a first image captured at a first camera and a second image captured at a second camera;
determine an expected first shift amount based on a first vertical location of a first portion within the first image;
determine an expected second shift amount based on a different second vertical location of a second portion within the first image, wherein the expected second shift amount differs from the expected first shift amount by a given amount; and
identify an object in the first image and the second image as off ground with respect to a road based on a first shift between a first point of the object at the first vertical location within the first image and a corresponding first point of the object at the first vertical location within the second image differing, by an amount that is different from the given amount, from a second shift between a second point of the object at the second vertical location within the first image and a corresponding second point of the object at the second vertical location within the second image.

13. The non-transitory machine-readable storage medium of claim 12, wherein the instructions upon execution cause the system to identify the object as off ground with respect to the road based on the first shift being the same as the second shift.

14. The non-transitory machine-readable storage medium of claim 12, wherein the instructions upon execution cause the system to identify the object as off ground with respect to the road based on a difference between the first shift and the second shift being less than the given amount.

15. The non-transitory machine-readable storage medium of claim 12, wherein the expected first shift amount is a shift of the first portion at the first vertical location in the first image relative to the first portion at the first vertical location in the second image, and wherein the expected second shift amount is a shift of the second portion at the second vertical location in the first image relative to the second portion at the second vertical location in the second image.

16. The non-transitory machine-readable storage medium of claim 15, wherein each of the first shift and the second shift is a lateral shift at a respective vertical location of the first and second vertical locations.

17. The non-transitory machine-readable storage medium of claim 12, wherein each of the first image and the second image comprises a representation of the road.

18. The non-transitory machine-readable storage medium of claim 17, wherein the instructions upon execution cause the system to identify a further object as being on the ground with respect to the road in response to determining that a third shift between a first point of the further object at the first vertical location within the first image and a corresponding first point of the further object at the first vertical location within the second image differing, by the given amount, from a second shift between a second point of the further object at the second vertical location within the first image and a corresponding second point of the further object at the second vertical location within the second image.

19. A method performed by a vehicle comprising a hardware processor, comprising:
receiving, at the vehicle, stereoscopic images comprising a first image captured at a first camera and a second image captured at a second camera;
determining an expected first shift amount based on a first vertical location of a first portion within the first image;
determining an expected second shift amount based on a different second vertical location of a second portion within the first image, wherein the expected second shift amount differs from the expected first shift amount by a given amount; and
identifying, at the vehicle, an object in the first image and the second image as off ground with respect to a road based on a first shift between a first point of the object at the first vertical location within the first image and a corresponding first point of the object at the first vertical location within the second image differing, by an amount that is different from the given amount, from a second shift between a second point of the object at the second vertical location within the first image and a corresponding second point of the object at the second vertical location within the second image.

20. The method of claim 19, comprising:
identifying, at the vehicle, a further object as being on the ground with respect to the road in response to determining that a third shift between a first point of the further object at the first vertical location within the first image and a corresponding first point of the further object at the first vertical location within the second image differing, by the given amount, from a second shift between a second point of the further object at the second vertical location within the first image and a corresponding second point of the further object at the second vertical location within the second image.

* * * * *